June 15, 1943.  G. C. PEARCE  2,321,850
DOMESTIC APPLIANCE
Filed June 18, 1941  3 Sheets-Sheet 1

INVENTOR.
GEORGE C. PEARCE.
BY
Spencer, Hardman and Fale.

June 15, 1943.  G. C. PEARCE  2,321,850
DOMESTIC APPLIANCE
Filed June 18, 1941   3 Sheets-Sheet 2

INVENTOR.
GEORGE C. PEARCE.
BY
Spencer, Hardman and Feke

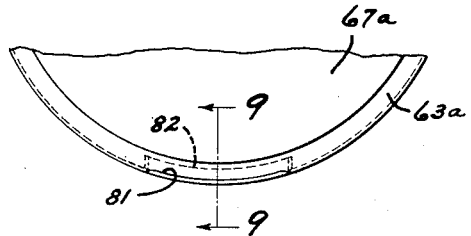
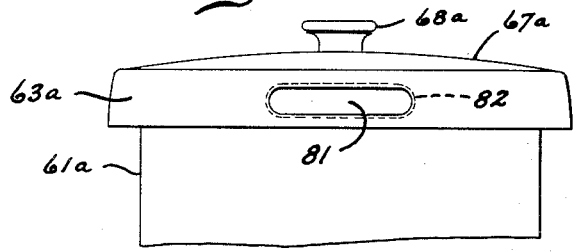
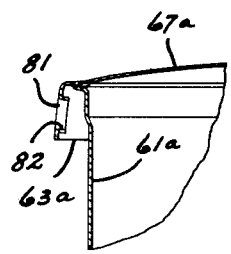
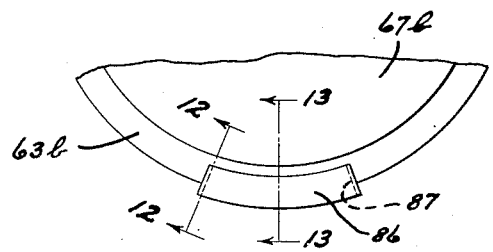
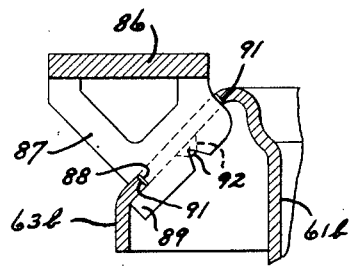
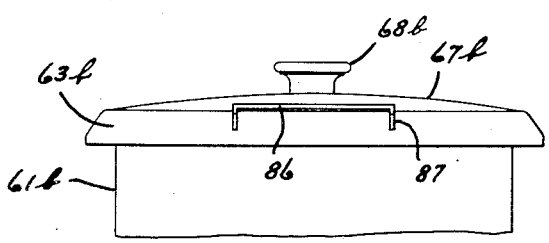
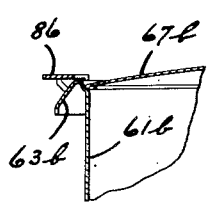

Patented June 15, 1943

2,321,850

UNITED STATES PATENT OFFICE 2,321,850

DOMESTIC APPLIANCE

George C. Pearce, Dayton, Ohio, assignor to General Motors Corporation, Dayton, Ohio, a corporation of Delaware Application June 18, 1941, Serial No. 398,629

2 Claims. (Cl. 219—35)

This invention relates to a domestic appliance and more particularly to deep well cookers for electric ranges.

An object of my invention is to provide an improved receptacle forming a deep well cooker for an electric range.

Another object of my invention is to provide an improved rim and handle arrangement on a deep well cooker for electric ranges which facilitates the placing of the cooker into the cooking well and the removal thereof therefrom.

A further object of my invention is to provide a deep well cooker for an electric range with handles that are disposed above the flat top of a range and intermediate the range top and the top of a rim on the cooker so as to be readily accessible in a direction substantially parallel with and adjacent to the range top.

In carrying out the foregoing objects, it is a still further and more specific object of my invention to provide a receptacle which has a relatively high rim depending from the top thereof and disposed above the top of a range with means formed integral with the rim above the top of the range and serving as handles to permit the fingers of the user to grasp the handles when the fingers are moved in a direction parallel with and adjacent to the range top.

Further objects and advantages of the present invention will be apparent from the following description, reference being had to the accompanying drawings, wherein a preferred form of the present invention is clearly shown.

In the drawings:

Fig. 7 is a side view of my improved well cooker with a modified form of handle integrally formed thereon;

Fig. 8 is a fragmentary top view of the well cooker shown in Fig. 7;

Fig. 9 is a fragmentary vertical sectional view of the modified form of well cooker and is taken on the line 9—9 of Fig. 8;

Fig. 10 is a side view of my improved well cooker with another modified form of handle thereon;

Fig. 11 is a fragmentary top view of the well cooker shown in Fig. 10;

Fig. 12 is a fragmentary vertical sectional view of the modified form of well cooker shown in Fig. 10 and is taken on the line 12—12 of Fig. 11; and Fig. 13 is a fragmentary vertical sectional view of the modified form of well cooker shown in Fig. 10, and is taken on the line 13—13 of Fig. 11.

Figure 2:
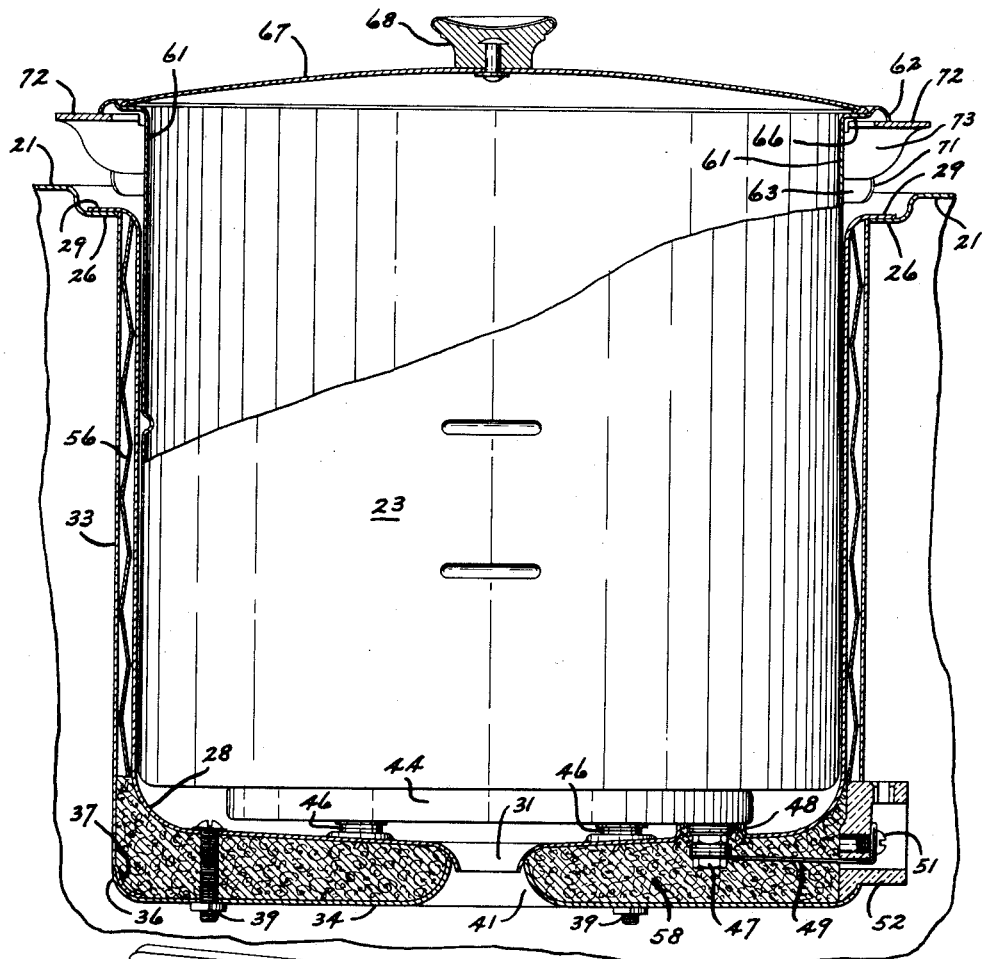
Fig. 2 is an enlarged vertical sectional view through a portion of the range disclosed in Fig. 1, showing the range cooking well and my improved well cooker disposed therein.
Figure 1:
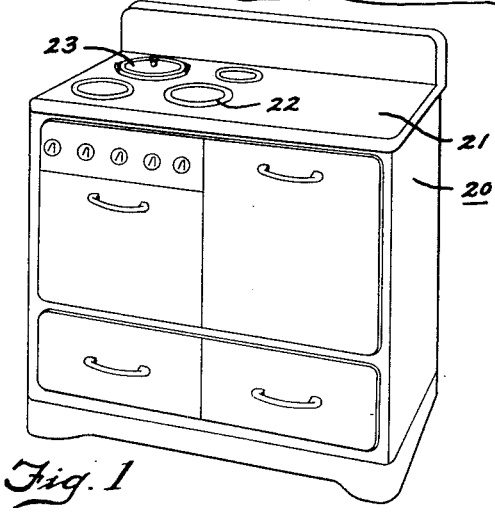
Fig. 1 is a perspective view of an electric range having a deep well cooker constructed in accordance with my invention incorporated therein.

Referring now to the drawings, for illustrating my invention, I have shown in Fig. 1 thereof an electric range 20 provided with a substantially flat top 21 having surface cookers or electric surface heating units 22 thereon. A deep well electric cooker 23 is also provided in the flat cooking top 21 of range 20. The range cooking top 21 is provided with an opening flanged, as at 26, to provide a depression about the opening so as to dispose the flange 26 below the flat surface of the range top 21 (see Fig. 2). The deep cooking well provided in the range 20 for the reception of a well cooker, generally represented by the reference character 23, is formed of an inner cup-shaped metal shell 28 having an outwardly turned rim 29 resting upon the recessed flange 26, about the round opening at the range top 21, in order to support the well forming means from the top of the range. Inner shell 28 is provided with lower rounded corners to facilitate cleaning of the interior thereof. At the center of the bottom of inner shell 28 there is an aperture bounded by a downwardly turned flange 31. This aperture and its flange 31 serves as a drain for the inner shell 28. The side walls of the shell 28 are surrounded by a sleeve 33 having its upper end clamped against the flange 29 of the inner shell by a bottom pan-like member 34. This bottom member 34 has its rounded edges 36 fitting tightly against the rounded lower edges 37 of the sleeve 33 which are shaped so as to receive the edges 36. Inner shell 28 is connected to the bottom pan-like member 34 by the bolts 39 which hold the well forming shell assembly together by holding the bottom member 34 tightly in engagement with the lower edge of the sleeve 33, while the upper edge of the sleeve 33 is held against the rim 29 of the inner shell 28. The bottom member 34 is provided with a central aperture bounded by an upwardly directed flange, as at 41, so as to receive the lower portion of the flange 31 on shell 28 to provide a drain opening in the bottom of the well forming means having rounded edges. The downwardly directed flange 31 overlaps the upper edge of flange 41 so that no liquid can flow into the insulation space provided between shell 28 and sleeve 33.

A disc-shaped, metal-clad electric heating element 44 is disposed within the well directly above the bottom of the inner shell 28 and is held in spaced relation to the bottom of this shell by a plurality of washers 46 which surround mounting studs provided for the heating element 44. The heating element 44 is provided in one side with three or more downwardly extending terminals 47 which extend through upwardly flanged apertures 48 provided in the bottom wall of shell 28. The upturned flanged edges of the apertures 48 prevent any liquid from flowing through these apertures into the insulating space. Terminals 47 are provided with nuts in order to connect flat strip-type of electric conductors 49 by binding screws 51 with terminals provided in the insulating block 52. Block 52 is molded in such a fashion that it may readily be held in a cutaway portion provided in the lower part of sleeve 33. In order to properly insulate the well, I place one or more sheets of aluminum foil 56 between the side walls of shell 28 and the sleeve 33. This foil insulation is preferably loosely wrapped around the shell 28 prior to its assembly with the sleeve 33 and bottom pan 34. I place insulation such as glass wool or mineral wool, designated at 58, in the space between the pan 34 and the bottom wall of shell 28.

Figure 3:
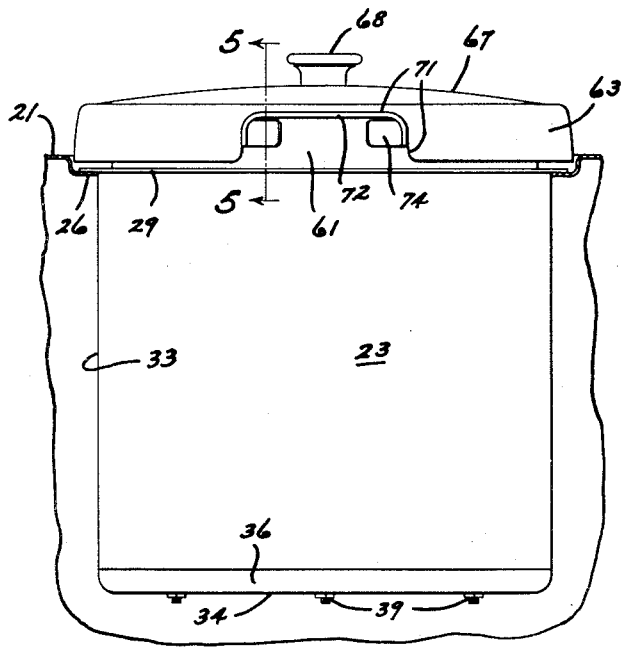
Fig. 3 is a fragmentary view similar to Fig. 2 showing the well cooker disposed in the range cooking well.
Figure 5:
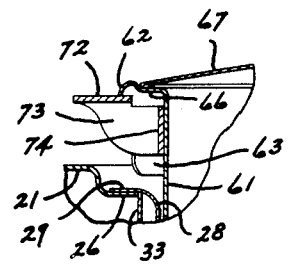
Fig. 5 is a fragmentary vertical sectional view taken on the line 5—5 of Fig. 3 showing a handle secured to the well cooker.
Figure 4:
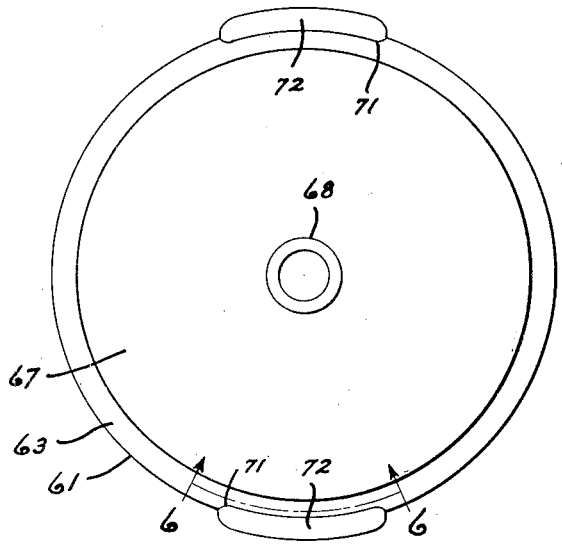
Fig. 4 is a top plan view of the well cooker disclosed in Figs. 2 and 3.
Figure 6:
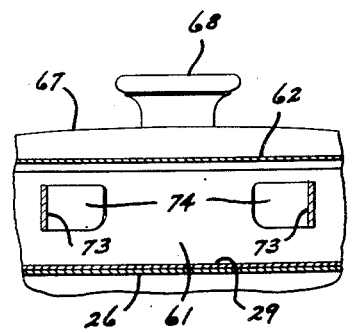
Fig. 6 is a fragmentary sectional view taken on the line 6—6 of Fig. 4 showing legs on the handle secured to the well cooker.

The cooking well provided as described is adapted to receive the deep well cooker device 23. This cooker 23 comprises a container or receptacle 61 having its edge at the upper opened end thereof formed outwardly and thence downwardly or flanged, as at 62, to provide a rim 63 (see Fig. 3) around the top of the container or receptacle. The rim 63 is relatively high and projects a substantial distance above the top 21 of range 20 for a purpose to become apparent hereinafter. The spacing washers 46 beneath the heating element 44 should be so adjusted in number as to hold the bottom edge of rim 63 slightly above the flange 29 of the inner shell 28 when the container or receptacle 61 rests directly upon or is supported by the heating element 44. The recess or the distance between the top surface of the top 21 of range 20 and the flange 29 should be sufficiently great under the circumstances of the present structure to position the bottom edge of rim 63 below the face of the range cooking top 21. This construction retards the escape of hot air from the cooking well. The flanged integral upper end of receptacle 61 is bent horizontally and outwardly from the wall of the receptacle as at 66 to provide a ledge for the support of a sheet metal lid or cover 67 on the receptacle. Cover or lid 67 is provided with a knob 68 to facilitate handling thereof and is preferably also provided with a suitable vent opening or the like (not shown). In the form of receptacle herein disclosed, it will be noted that the top of the rim on the receptacle is spaced a substantial distance above the top surface 21 of the range 20. This arrangement provides ample space between the top of the receptacle 61 and the range top 21 for the provision of handles on the receptacle and which handles can be grasped by the operator or user by moving the fingers toward the handles in a direction substantially parallel with the top surface of the range 21. I prefer to provide the receptacle 61, of the well cooker 23, with stationary handles in order to facilitate handling of the receptacle or container and in the form of device shown in Figs. 1 to 6, of the drawings, I provide the rim 63 with opposed cutaway portions 71 (see Fig. 3) which extend from the bottom edge of rim 63 to a point spaced from the top of the rim. Metal handles comprise a flat horizontal portion 72 having depending legs 73 which are provided with bent portions 74 (see Figs. 3, 5 and 6). The bent portions 74 of legs 73 may be riveted or preferably as disclosed welded to the side wall of the receptacle 61 of cooker 23. The horizontal handle portion 72 of the receptacle handles is disposed intermediate the top of the rim 63 and the bottom edge thereof. In other words, the handle portion 72 is located in the plane of and parallel to a zone, established by the projecting upper part of receptacle 61, adjacent to and parallel with the top 21 of range 20. This positioning of the handle portion 72 of the receptacle handles a substantial distance above the top 21 of the range, eliminates the necessity of extending handles upwardly above the top of the receptacle and eliminates the necessity of providing the receptacle with folding handles. The positioning of the handles in the zone as described permits insertion thereinto of the fingers of the user by moving the fingers toward the receptacle substantially within the plane of rim 63 and intermediate the receptacle top and the top 21 of the range.

In the form of my invention disclosed in Figs. 7, 8 and 9, I show a modified type of handle or handles for the receptacle 61a. In this modified device, the handles are formed integral with the receptacle 61a and are provided by cutting a horizontally elongated opening 81 out of the rim 63a. The edges of opening 81 may be bent inwardly of the rim 63a as at 82 (see Fig. 9) to provide a handle which consists of a little more than the edges or walls of opening 81. It will be noted that this handle or handles 81, integrally formed with the rim 63a, is located intermediate the top of rim 63a and its bottom edge. The handle 81 is spaced a substantial distance above the top of the range and is in the plane of a zone, established by the projecting top of the receptacle, adjacent to and parallel with the range top. Thus the handle or handles 81 are disposed so as to be readily accessible in that the fingers of the user may be inserted into the handles by movement thereof parallel with the plane of the zone and horizontally along the range top.

There is still another modified form of device disclosed in Figs. 10 to 13 of the drawings, and in this modification the handle or handles are stationarily secured directly to the rim 63b instead of being secured to the vertical wall of the receptacle 61b. In this modification, the rim 63b is of a slightly different form or cross-sectional contour so as to provide a flat-like portion thereon for the mounting of handles thereto. The handle or handles of this modified showing comprise a horizontal portion 86 provided at its ends with depending legs 87. Each leg 87, of the handle, is provided with a notch 88 and a tongue-like portion 89 adjacent the notch 88 (see Fig. 12). The legs 87 are passed into slots 91, provided in the rim 63b, a distance to cause the notch 88 in the legs to register with the bottom edge of the slot 91 whereupon the notch receives the part of rim 63b adjacent the slot 91 to cause locking of the handle upon the rim. Locking of the handle to rim 63b is made permanent by staking or peening over some of the metal of the handle legs against the inner wall surface of the rim as indicated at 92 in Fig. 12. It will be noted that the horizontal part 86 of the handle shown in this further modification is disposed a substantial distance above the bottom edge of flange or rim 63b and is thereby spaced a considerable distance above the top of the range to provide the easy access thereto as set forth relative to the other handle disclosures herein made.

From the foregoing, it will be apparent that I have provided an improved deep well cooker receptacle for an electric range and the novel handle arrangements therefor as herein disclosed are readily accessible above the top surface of the range to facilitate removal of the cooker receptacle from the range cooking well. By the improved handle arrangements disclosed, I have eliminated the necessity for providing the cooker with folding or pivotally mounted handles and have rendered the handles accessible in the path of moving the operator's hands horizontally along and adjacent to the top surface of the range so that the fingers of the operator may be readily inserted into the handles. The relatively high rim provided on the receptacle improves the appearance of well cookers and readily differentitates a well cooker device from a surface heating element or cooker on the top of a range.

While the form of embodiment of the invention as herein disclosed, constitutes a preferred form, it is to be understood that other forms might be adopted, all coming within the scope of the claims which follow.

What is claimed is as follows:

1. A cooking device comprising in combination, a range having a substantially flat top and provided with means forming walls of a well depending from said range top, an electric heating element associated with said well forming means, a receptacle removably disposed in the well in thermal association with said heating element and having its top portion projecting from the well, said receptacle top portion being provided with an outwardly and downwardly directed flange forming a rim therearound extending to a point closely adjacent the top of said range, said downwardly directed part of said flange having integral portions thereof intermediate the top and bottom of said rim bent inwardly to provide opposed horizontally elongated and horizontally facing finger receiving openings serving as handles to facilitate lifting of said receptacle out of the well, and said handles being disposed above the top of said range whereby the fingers of the user may be inserted into the openings in said rim by movement of the fingers horizontally along said range top.

2. A cooking device comprising in combination, a range having a substantially flat top and provided with means forming walls of a well depending from said range top, an electric heating element associated with said well forming means, a receptacle removably disposed in the well in thermal association with said heating element and having its top portion projecting from the well, said receptacle top portion being provided with an outwardly and downwardly directed flange forming a rim therearound extending to a point closely adjacent the top of said range, said downwardly directed part of said flange having opposed horizontally facing finger receiving open portions therein providing handles integral with and intermediate the uppermost and lowermost portions of the rim to facilitate lifting of said receptacle out of the well, and said handles being disposed above the top of said range whereby the fingers of the user may be inserted into the open portions in said rim by movement of the fingers horizontally along said range top.

GEORGE C. PEARCE.